United States Patent [19]
Yanagisawa

[11] Patent Number: 5,419,410
[45] Date of Patent: May 30, 1995

[54] DELIVERY SYSTEM

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano-ken, Japan

[21] Appl. No.: 178,134

[22] Filed: Jan. 6, 1994

[30] Foreign Application Priority Data

Jan. 19, 1993 [JP] Japan ................................. 5-024869

[51] Int. Cl.⁶ .............................................. E04H 3/04
[52] U.S. Cl. ..................................... 186/49; 414/273; 901/16
[58] Field of Search ........................ 186/38, 39, 45, 46, 186/47, 48, 49, 50, 52, 55, 56, 57, 69; 414/222, 273, 749, 751; 901/16, 47

[56] References Cited

U.S. PATENT DOCUMENTS

| | | | |
|---|---|---|---|
| 3,378,105 | 4/1968 | Kroemer | 186/49 |
| 4,190,134 | 2/1980 | Kato | 186/46 |
| 4,582,172 | 4/1986 | Takeuchi et al. | 186/38 |
| 4,588,047 | 5/1986 | de Reynal de St. Michel | 186/38 |
| 4,681,504 | 7/1987 | Welch, Sr. | 414/273 X |
| 4,846,620 | 7/1989 | Mims | 414/273 |
| 5,020,958 | 6/1991 | Tuttobene | 414/273 X |
| 5,132,789 | 7/1992 | Ammon et al. | 414/273 X |
| 5,165,296 | 11/1992 | Yanagisawa | 901/16 X |

FOREIGN PATENT DOCUMENTS

| | | | |
|---|---|---|---|
| 2723012 | 11/1978 | Germany | 414/542 |
| 0040484 | 3/1979 | Japan | 186/57 |
| 62-12377 | 3/1987 | Japan . | |

*Primary Examiner*—Michael S. Huppert
*Assistant Examiner*—Scott L. Lowe

[57] ABSTRACT

A delivery system, which is capable of quickly and correctly delivering an item to a destination. In the delivery system of the present invention, a moving section is capable of holding an item to be delivered. A driving mechanism is capable of moving the moving section in a plane. A frame section encloses the plane in which the moving section is moved. A plurality of input sections are capable of independently inputting data, and are provided to the frame section. A control section is capable of controlling the driving mechanism on the basis of the data inputted by the input sections so as to move the moving section in the plane.

15 Claims, 3 Drawing Sheets

DELIVERY SYSTEM

BACKGROUND OF THE INVENTION

The present invention relates to a delivery system. More precisely, the present invention relates to a delivery system, which is preferably used for restaurant waiting services, etc..

Recently, for example, in the field of meal services, automatic delivery systems have been proposed so as to solve a problem of a lack of man power, and some of them have been used. In some sushi bars, for example, an automatic delivery system is used. The system has a rectangle or long circular counter, and an endless conveyor provided along the counter. Sushi plates are mounted on the endless conveyor to convey by turns. Customers sitting around the counter take the sushi plates, on which the sushi is placed, from the conveyor.

However, the conventional delivery system has the following disadvantage.

Since sushi plates or members to be delivered are conveyed by the conveyor, it takes a long time to convey the sushi plates from a serving position at which they are mounted on the conveyor to customers sitting in positions which are far away from the serving position. Especially, in the case of a huge counter, it takes a longer time.

SUMMARY OF THE INVENTION

An object of the present invention is to provide a delivery system, which is capable of quickly and correctly delivering an item to be delivered to a destination.

To achieve the object, the delivery system of the present invention comprises:
- a moving section capable of holding a member to be delivered;
- a driving mechanism capable of moving the moving section in a plane;
- a frame section enclosing a plane in which the moving section is moved;
- a plurality of input sections capable of independently inputting data, the input sections being provided on the frame section; and
- a control section capable of controlling the driving mechanism on the basis of the data inputted by the input sections so as to move the moving section in the plane.

In the delivery system of the present invention, the control section is capable of controlling the driving mechanism on the basis of the data inputted by the input sections, so that the moving section can be directly moved to a destination. Therefore, the member to be delivered, which is held by the moving section, can be quickly and correctly delivered to the predetermined destination. With this effect, the delivery system of the present invention can be applied in various service fields, and is capable of raising working efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described by way of an example and with reference to the accompanying drawings, in which.

DETAILED DESCRIPTION OF A PREFERRED EMBODIMENT

A preferred embodiment of the present invention will now be described in detail with reference to the accompanying drawings. Note that, an automatic delivery system for a sushi bar, which is an example of the delivery system of the present invention, will be explained as the embodiment.

Figure 1:
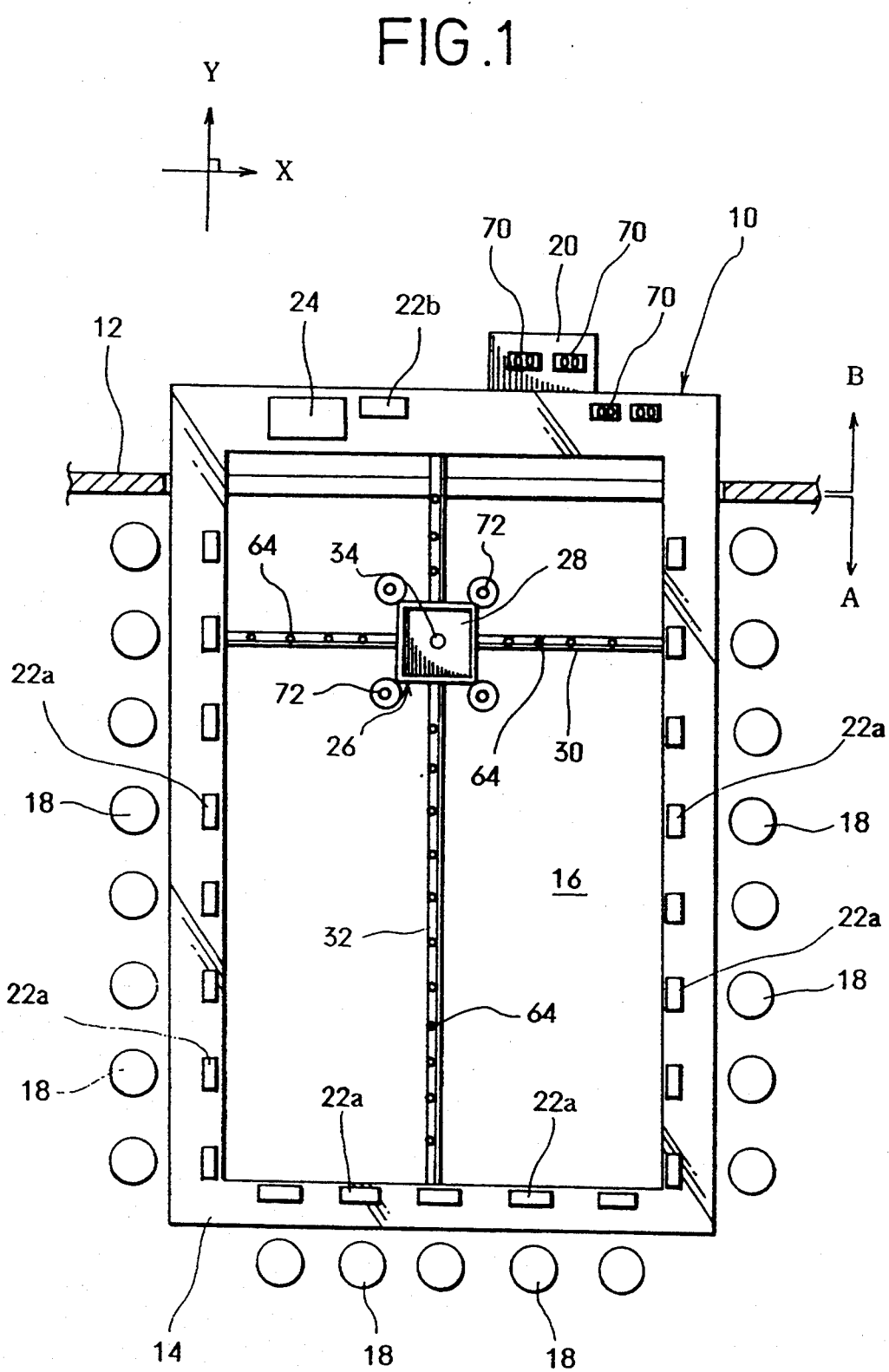
FIG. 1 is a plan view of a delivery system in a sushi bar, which is an embodiment of the present invention.

FIG. 1 is a plan view of the delivery system, which is to be installed in a sushi bar.

A delivery system 10 is divided into a customer section A and a cooking section B by a partition 12. Sushi is prepared by cooks in the cooking section B. On the other hand, customers eat sushi in the customer section A.

A counter 14, which is an example of a frame section, is formed like a rectangular hollow frame. The counter 14 encloses a rectangular plane 16. In the customer section A, there are provided chairs 18 along three sides of the counter 14. Customers will sit on the chairs 18. There is provided a stand-by table 20 on which sushi plates 70, which are an example of an item to be delivered, will be prepared in the cooking section B. The sushi plates 70, of course, may be prepared on a part of the counter in the cooking section B.

Customer input sections 22a are provided on the counter 14 in the customer section A. Each input section 22a has, for example, a touch panel unit and a liquid crystal display (LCD) unit. And each input section 22a is provided for each chair 18. A customer is able to order sushi by the touch panel unit of the input section 22a and confirm the order by watching the LCD unit thereof. Order data of each customer can be inputted by each input section 22a. Note that, identification codes of the input sections 22a are previously assigned.

A display unit 24, e.g., a cathode ray tube, is provided in the cooking section B. The order data inputted by the input sections 22a are shown with the identification codes of the input sections 22a. Note that, the order data are lined up in order of inputting. The cooks in the cooking section B know the kinds and order number of the sushi and the identification codes of the input sections 22a (customers).

An input section 22b is provided on the counter in the cooking section B. The input section 22b is, for example, a keyboard, which is capable of inputting delivery data of the sushi to be delivered, e.g., kinds of sushi; and the identification codes of the input sections 22a (destinations). When the delivery data are inputted by the input section 22b, corresponding order data shown in the display unit 24 can be confirmed by changing color. Note that, upon completing delivery of sushi, the order data of the sushi delivered are deleted from the display unit 24.

A tray 28 is fixed on an upper face of a moving section 26. One or a plurality of sushi plates 70 can be held in the tray 28. When the moving section 26 is in the vicinity of the stand-by table 20, the cook is capable of transferring the sushi plates 70, which have been located on the stand-by table 20 or the counter 14, onto the tray 28 via an opening section of the partition 12. The moving section 26 is capable of moving in the rectangular plane 16. The moving section 26 is driven by a driving mechanism, described later. An X-rod 30, which is an example of a first moving guide, arranged in the X-direction is pierced through the moving section 26; a Y-rod 32, which is an example of a second moving guide, arranged in the Y-direction is also pierced therethrough. With this structure, the moving section 26 is capable of moving on the rods 30 and 32. The moving section 26 is capable of moving in the X-direction along the X-rod 30; the moving section 26 is capable of moving in the Y-direction along the Y-rod 32, so that the moving section 26 is capable of executing two dimensional movement. Note that, the first and second moving guides are not limited to the rods 30 and 32, linear guides, for example, may be used as the first and second moving guides.

A sensor 34, which is an example of means for detecting the sushi plates 70, is provided in the tray 28. The sensor 34 is, for example, a photo sensor being capable of detecting if the sushi plates 70 are on the tray 28 or not. When the sensor 34 detects the sushi plates 70 on the tray 28 and said delivery data are inputted by the input section 22b, the sushi plates 70 can be delivered on the basis of the delivery data. In the present embodiment, the X- and Y-rods 30 and 32 are made of a transparent and fully tough plastic material, e.g., acrylic plastics, and a multiple light emitting diodes (LEDs) 64 and their electric lines 65 (see FIG. 3) are molded therein. The LEDs 64 are randomly or selectively lit. And electric lines 35 (see FIG. 3) connected to the sensor 34 are provided on an outer face of the X-rod 30 or the Y-rod 32, and brushes (not shown), which are always capable of sliding on the lines 35, are fixed to the moving section 26. By the lines 35 and the brushes, the sensor 34 and the lines 35 can be always electrically connected one another. Note that, if the lines 35 cannot be provided to the X-rod 30 or the Y-rod 32, signals of the sensor 34 can be transmitted by a radio transmitter.

Successively, the driving mechanism for moving the moving section 26 in the plane 16 will be explained with reference to FIG. 2.

X-ball bearing screws 36a and 36b are arranged in the X-direction, and are capable of rotating on their axes.

Y-ball bearing screws 38a and 38b are arranged in the Y-direction, and are capable of rotating on their axes.

X-blocks 40a and 40b are respectively screwed with the X-ball bearing screws 36a and 36b. Ends of the Y-rod 32 are respectively fixed to the X-blocks 40a and 40b, and the X-blocks 40a and 40b are slidably fitted to linear guides (not shown). With this structure, the X-blocks 40a and 40b are unable to rotate; the X-blocks 40a and 40b are capable of moving in the X-direction by the rotation of the X-ball bearing screws 36a and 36b.

Y-blocks 42a and 42b are respectively screwed with the Y-ball bearing screws 38a and 38b. Ends of the X-rod 30 are respectively fixed to the Y-blocks 42a and 42b, and the Y-blocks 42a and 42b are slidably fitted to linear guides (not shown). With this structure, the Y-blocks 42a and 42b are unable to rotate; the Y-blocks 42a and 42b are capable of moving in the Y-direction by the rotation of the Y-ball bearing screws 38a and 38b.

An X-motor 44, which is an example of first driving means, is capable of directly rotating the X-ball bearing screw 36a; the X-motor 44 is capable of rotating the X-ball bearing screw 36b via four bevel gears 46a and a shaft 48a. Rotational direction and rotational speed of the X-ball bearing screw 36a can be the same as that of the X-ball bearing screws 36b, so that the Y-rod 32 can always be kept parallel to the Y-axis.

A Y-motor 50, which is an example of second driving means, is capable of directly rotating the Y-ball bearing screw 38a; the Y-motor 50 is capable of rotating the Y-ball bearing screw 38b via four bevel gears 46b and a shaft 48b. Rotational direction and rotational speed of the Y-ball bearing screw 38a can be the same as that of the Y-ball bearing screws 38b, so that the X-rod 30 can always be kept parallel to the X-axis.

By controlling rotational angle of the X- and the Y-motors 44 and 50, positions of the moving section 26 in the plane 16 can be controlled.

Note that, the X- and the Y-motors 44 and 50 are provided at proper positions on the counter 14 so as not to interrupt movement of any parts. Since ends of the X-rod 30 are respectively connected to the Y-blocks 42a and 42b, and ends of the Y-rod 32 are respectively connected to the X-blocks 40a and 40b, there are four slits 52 through which the X- and the Y- rods 30 and 32 pass on four inner faces of the counter 14.

Figure 2:
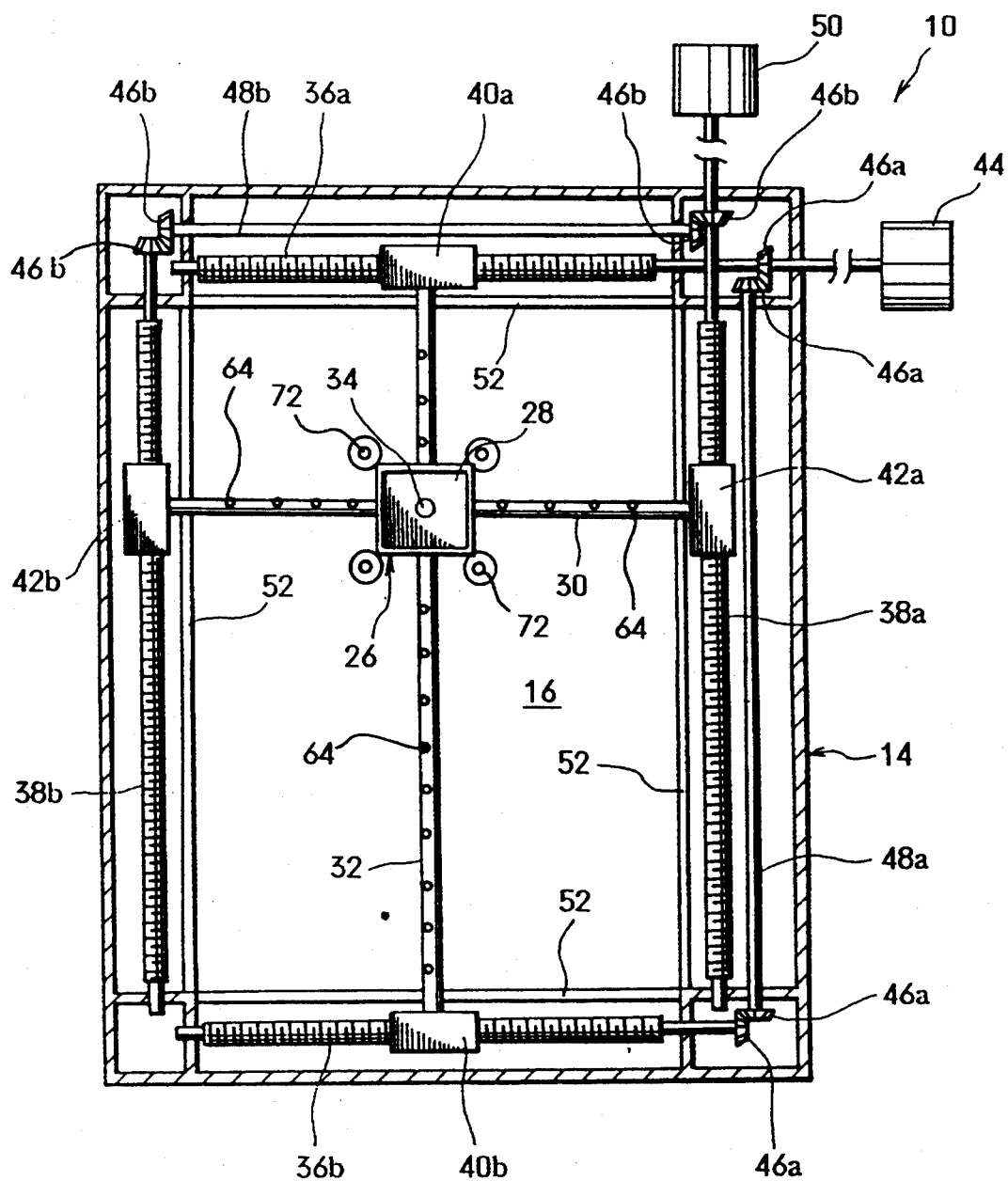
FIG. 2 is a plan sectional view of a driving mechanism of the delivery system.

In the present embodiment, the driving mechanism has the structure shown in FIG. 2 but the driving mechanism is not limited to this embodiment. Various types of driving mechanisms, e.g., mechanisms disclosed in Japanese Patent Kokai Gazette No. 63-191533; Japanese Patent Kokai Gazette No. 2-134443; Japanese Patent Kokai Gazette No. 2-284094; and Japanese Patent Kokai Gazette No. 4-48, may be applied as the driving mechanism.

Figure 3:
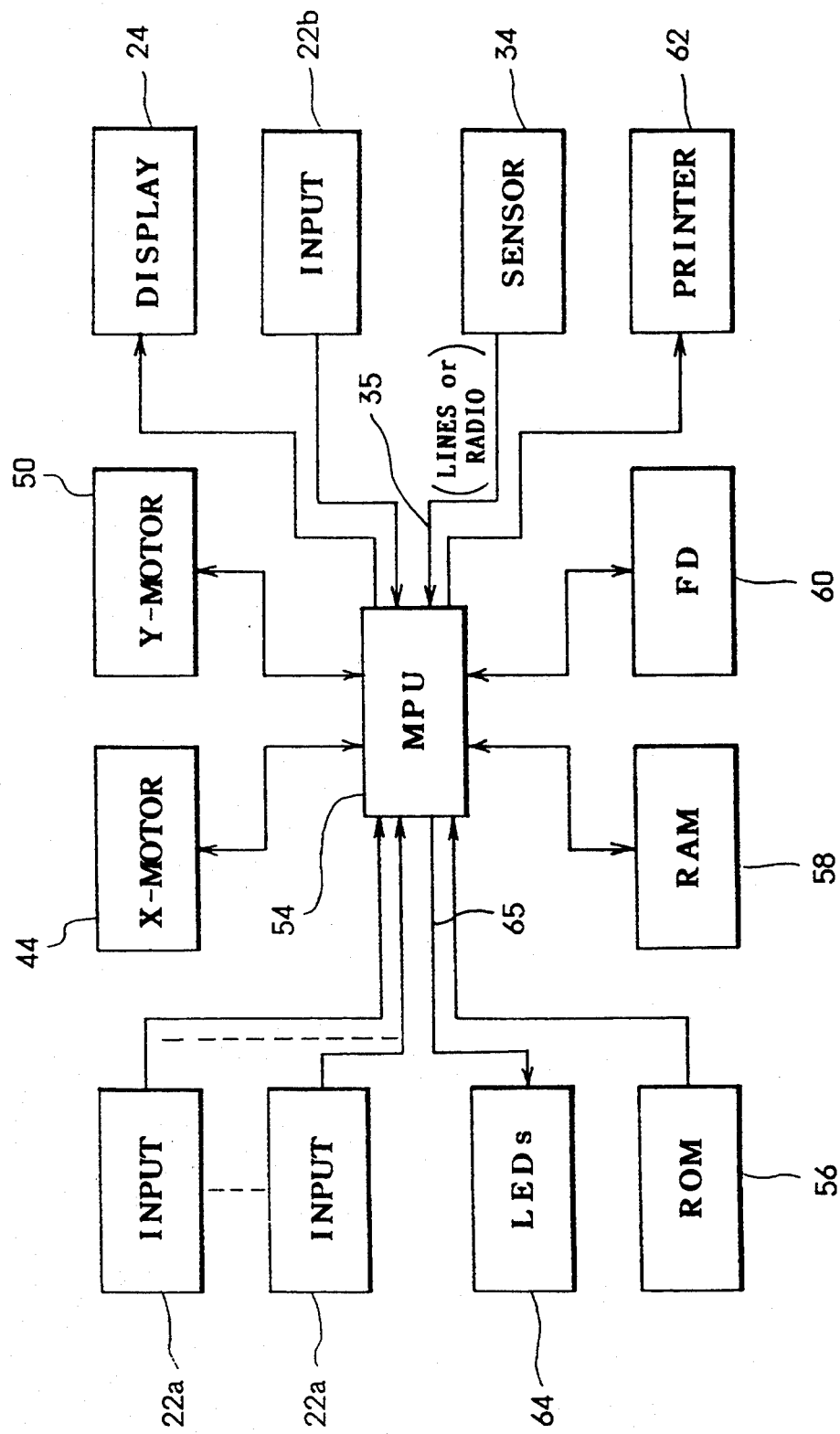
FIG. 3 is a block diagram of a control system of the delivery system.

Next, a control system of the delivery system will be explained with reference to FIG. 3.

A microprocessor (MPU) 54, which is an example of a control section, is provided in the counter 14. The MPU 54 is capable of moving the moving section 26 in the plane 16 on the basis of the data inputted by the input sections 22a and 22b. Namely, when a customer inputs the order data by the input section 22a, the MPU 54 moves the moving section 26 to the position in front of the stand-by table 20. On the other hand, when the sushi plate 70 on which sushi is placed is on the tray 28 and the delivery data are inputted by the input section 22b, the MPU 54 moves the moving section 26 holding the sushi plates 70 to a position in front of the customer (or the input section 22a of the customer). To move the moving section 26 to correct positions, the MPU 54 controls the X- and the Y-motors 44 and 50 by a method of a feed back control. The MPU 54 is capable of knowing if the sushi plates 70 are on the tray 28 or not by the sensor 34. Furthermore, the MPU 54 controls the delivery system on the basis of control programs, control data and commands inputted.

A ROM 56 previously stores operating systems of the MPU 54, the control programs, the control data, etc..

A RAM 58 is capable of temporally storing the order data inputted by the input sections 22a, the delivery data inputted by the input section 22b, the data displayed on the display unit 24, and information processed by the MPU 54, etc..

A flexible disk 60, which is an example of a secondary memory unit, is capable of storing, for example, the data, e.g., kinds of sushi; and the identification codes of the input sections 22a, delivered in order. By processing the data, bills for each customer (or each input section 22a) can be made, and sales data for each specific period, e.g., day; week; month; and year, can be made, too. Note that, if the input sections 22a have printer units, the bills may be printed by the printer units. And the bills may be shown on the LCD units of the input sections 22a instead of printing by the printer units.

A printer 62 for an accounts service is capable of printing the bills, the sales data, etc..

Note that, the LEDs 64 are, as described above, molded in the X- and the Y-rods 30 and 32, and the LEDs 64 are randomly or selectively lit by the MPU 54 for decoration.

In the delivery system for a sushi bar, customers sit on favorite seats and input the order data by the input sections 22a.

Upon inputting the order data by the input sections 22a, the MPU 54 shows the order data with the identification codes of the input sections 22a on the display unit 24 as the delivery data in order of inputting. Then the MPU 54 drives the X- and the Y-motors 44 and 50 so as to move the moving section 26 to the position in front of the stand-by table 20.

The cooks in the cooking section B know the order data by watching the display unit 24 so as to prepare the ordered sushi. The sushi plates 70 on which the ordered sushi is placed are placed on the tray 28 of the moving section 26. When the sushi plates 70 are placed, the cook inputs the delivery data, e.g., the identification codes of the input section 22a; and the kinds of the sushi, by the input section 22b.

The MPU 54 checks if the sushi plates 70 are placed on the tray 28 by the sensor 34. When the delivery data including the identification code of the destination (the input section 22a which has inputted the order data) is inputted by the input section 22b, the MPU 54 drives the X- and the Y-motors 44 and 50 so as to move the moving section 26 to the destination or the position in front of the customer who ordered the sushi by the input section 22a. Simultaneously, the MPU 54 deletes the delivery data of the sushi delivered from the display unit 24. The MPU 54 also maintains data as to a treated order for the bill or the sales data and stores them in the flexible disk 60.

Upon reaching the destination, the MPU 54 checks whether the sushi plates 70 are taken from the tray 28 by the sensor 34. If the sushi plates 70 are taken from the tray 28, the MPU 54 drives the X- and the Y-motors 44 and 50 again so as to return the moving section 26 to the position in front of the stand-by table 20 for a next delivery.

In the present embodiment, the counter 14 has a hollow inner space including the plane 16, some decorating means or sushi samples may be provided in the hollow space.

Robot hands 72, which are capable of gripping and releasing things, may be provided to the moving section 26. In this case, bottles of beer, juice, etc., which have been located in predetermined positions in the hollow inner space, can be delivered to the customers. Note that, in the case of having the robot hands 72, the X- and the Y-rods 30 and 32 are preferably made of tough materials such as steel due to the heavy weight of the robot hands 72. Furthermore, there may be a plurality of moving sections for the tray 28 and the robot hands 72. In this case, the moving sections may be independently driven by a plurality of driving mechanisms.

In the above description, the sushi plates 70 on which the sushi is placed are delivered to the customers. The delivery system is capable of collecting vacant plates 70 and vacant bottles from the customers for washing.

In the present embodiment, the delivery system is applied to the sushi bar but the system can be applied to many shops, factories, etc.. For example, the delivery system having the robot hands 72 can be used for delivering microphones in Karaoke bars and for delivering and collecting tips in casinos, etc..

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A delivery system, comprising:
   a moving section capable of holding a member to be delivered;
   a driving mechanism capable of moving said moving section two dimensionally in a plane;
   a frame section surrounding the plane in which said moving section is moved, said frame section being formed as a counter having a plurality of customer seating sections;
   a plurality of input sections being capable of independently inputting data, said input sections being provided at said seating sections; and
   a control section capable of controlling said driving mechanism based on data inputted by said input sections so as to move said moving section linearly in the plane along a shortest course from a departure point to each customer seating section.

2. The delivery system according to claim 1, further comprising a tray on which said member to be delivered is placed, said tray being provided on said moving section.

3. The delivery system according to claim 1, further comprising a display unit being capable of showing the data inputted by said input sections.

4. The delivery system according to claim 1, further comprising means for detecting said member to be delivered, said detecting means being provided to said moving section, and
   wherein said control section returns said moving section to a predetermined position when said detecting means detects no member to be delivered at a destination of said moving section.

5. The delivery system according to claim 1, further comprising a robot hand, which is capable of gripping said member to be delivered, being provided to said moving section.

6. The delivery system according to claim 1, wherein said control section processes delivery management and sales management data.

7. The delivery system according to claim 1, wherein said frame section is formed as a rectangle which includes eating stages along three sides of said rectangle and a food preparation stage along a fourth side thereof.

8. The delivery system according to claim 1, wherein said customer seating sections are eating sections.

9. The delivery system according to claim 1, further comprising means for detecting said member to be delivered, said detecting means being provided on said moving section.

10. The delivery system according to claim 9, wherein said detecting means and said control section are connected by radio.

11. The delivery system according to claim 1, wherein said driving mechanism comprises:
- a first moving guide being arranged in a first direction, and being capable of moving in a second direction perpendicular to the first direction;
- a second moving guide being arranged in the second direction, and being capable of moving in the first direction;
- a first driving means for moving said first moving guide in the second direction; and
- a second driving means for moving said second moving guide in the first direction,
wherein said moving section is capable of moving in the first direction along said first moving guide and in the second direction along said second moving guide.

12. The delivery system according to claim 11, wherein said first moving guide and said second moving guide are rods.

13. The delivery system according to claim 12, further comprising means for detecting said member to be delivered, said detecting means being provided to said moving section, and
wherein said detecting means and said control section are connected by electric lines, which are provided to said rods.

14. The delivery system according to claim 12, wherein said rods are transparent ones in which means for decorating are provided.

15. The delivery system according to claim 14, wherein said decorating means are multiple light emitting diodes.

* * * * *